United States Patent
Tsuchiya et al.

(10) Patent No.: US 6,726,445 B2
(45) Date of Patent: Apr. 27, 2004

(54) REDUCED NOISE FAN STATIONARY BLADE

(75) Inventors: Naoki Tsuchiya, Oume (JP); Ryou Umeyama, Oume (JP); Dai Kato, Oume (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 5 days.

(21) Appl. No.: 10/220,061

(22) PCT Filed: May 16, 2002

(86) PCT No.: PCT/JP02/04734
§ 371 (c)(1),
(2), (4) Date: Aug. 28, 2002

(87) PCT Pub. No.: WO02/103206
PCT Pub. Date: Dec. 27, 2002

(65) Prior Publication Data
US 2003/0215325 A1 Nov. 20, 2003

(30) Foreign Application Priority Data
May 24, 2001 (JP) ......................................... 2001-154865

(51) Int. Cl.⁷ ............................. F01D 9/04; F01D 25/04
(52) U.S. Cl. .................... 415/119; 415/191; 415/208.2; 415/211.2
(58) Field of Search ................................. 415/119, 191, 415/192, 208.1, 208.2, 211.2

(56) References Cited

U.S. PATENT DOCUMENTS

| | | | | | |
|---|---|---|---|---|---|
| 2,154,313 A | * | 4/1939 | McMahan | ..................... | 415/191 |
| 4,761,115 A | * | 8/1988 | Hopfensperger | ............ | 415/119 |
| 5,466,120 A | * | 11/1995 | Takeuchi et al. | ............. | 415/119 |

FOREIGN PATENT DOCUMENTS

| EP | 079216 A2 | | 5/1983 | | |
|---|---|---|---|---|---|
| GB | 712589 A | * | 7/1954 | ................. | 415/192 |
| JP | 3-189304 A | * | 8/1991 | .............. | 415/208.1 |
| JP | 05-312003 | | 11/1993 | | |
| JP | 2000-204903 | | 7/2000 | | |
| JP | 2001-099095 | | 4/2001 | | |
| SU | 1682605 A | * | 10/1991 | ................. | 415/191 |
| SU | 1687802 A | * | 10/1991 | .............. | 415/208.2 |

* cited by examiner

*Primary Examiner*—Christopher Verdier
(74) *Attorney, Agent, or Firm*—Griffin & Szipl

(57) ABSTRACT

A low noise fan stationary blade, wherein a negative lean angle $\theta_L$ in the reverse direction of a rotating direction is provided near a hub and a positive lean angle $\theta_L$ in the rotating direction is provided on the other tip side, the negative lean angle $\theta_L$ is $-10°\pm3°$ in a high loss area near the hub and the positive lean angle $\theta_L$ is $30°\pm3°$ on the tip side, a positive sweep angle $\theta s$ is provided, and the positive sweep angle $\theta s$ is $20°\pm3°$ on the hub side and $20°\pm3°$ also on the tip side, whereby a total pressure loss on both hub and tip sides can be reduced, noise can be reduced on both hub and tip sides, and thus noise can be reduced without lowering an aerodynamic performance.

6 Claims, 6 Drawing Sheets

Side-view

Rear-view

Suction side
Trailing edge
Pressure side
$\theta_L$
$\theta_L$
Hub casing
Rear-view Leading edge
$\theta_S$
Hub casing
Side-view

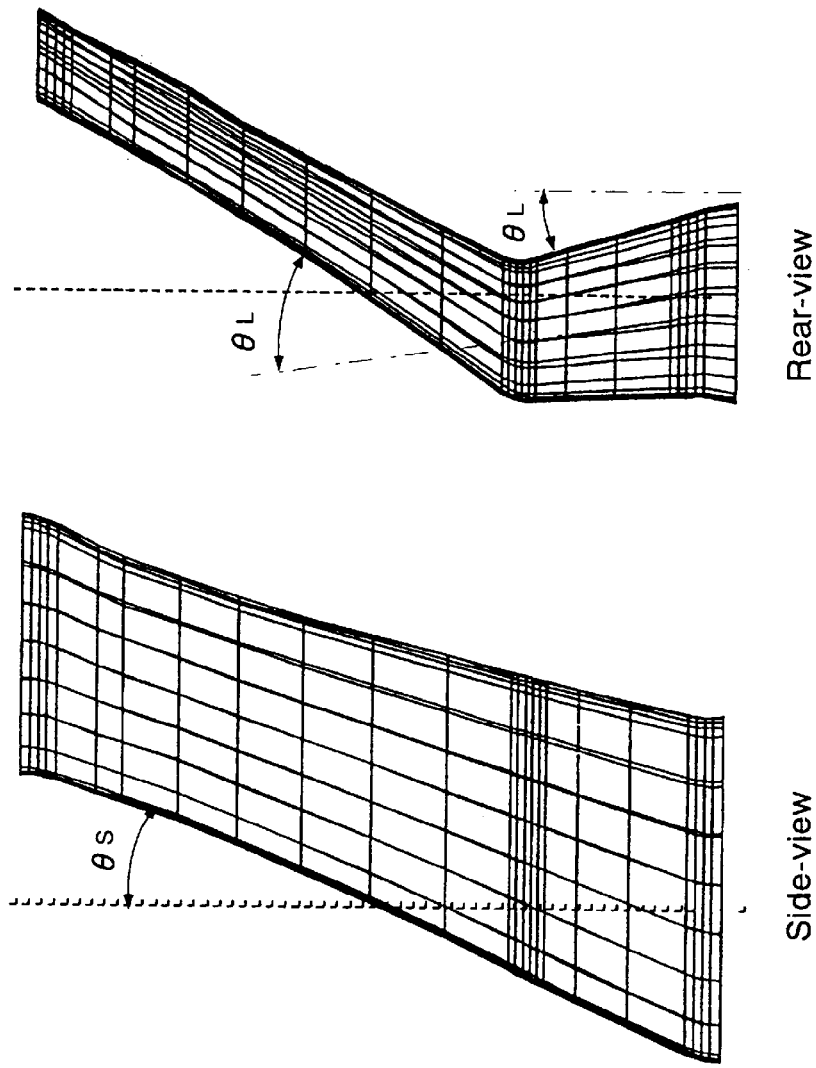

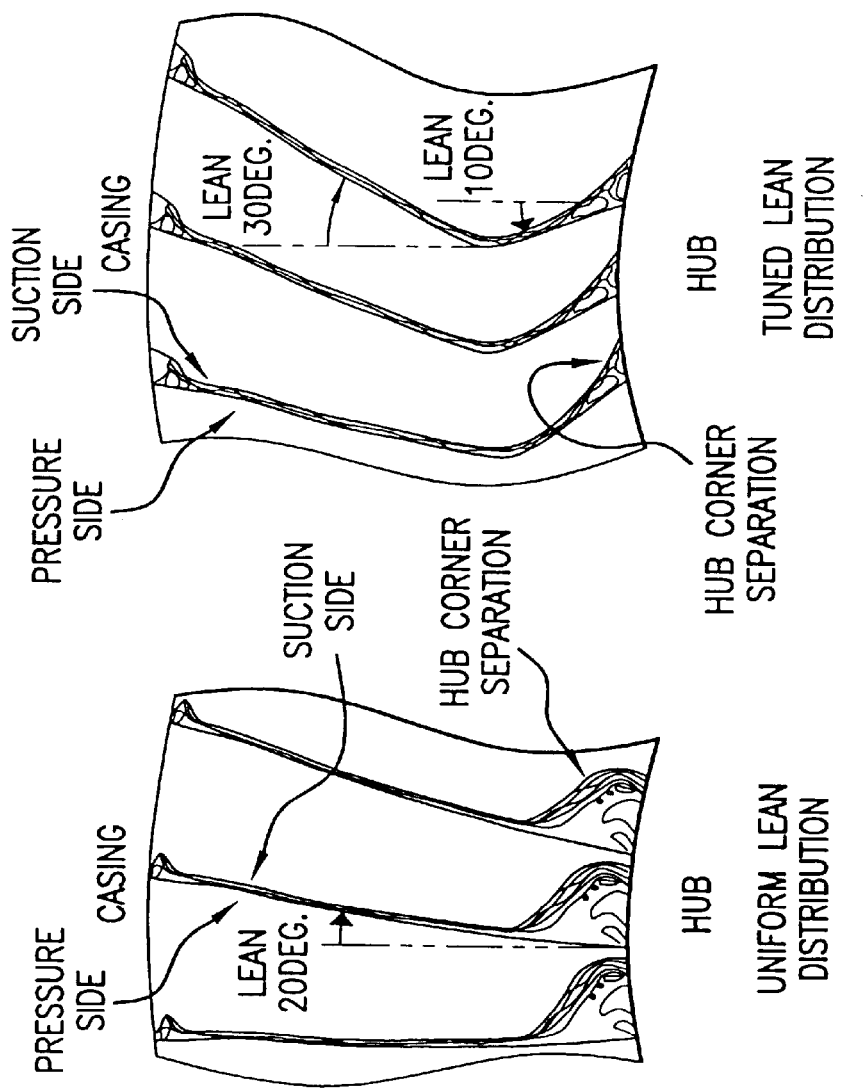
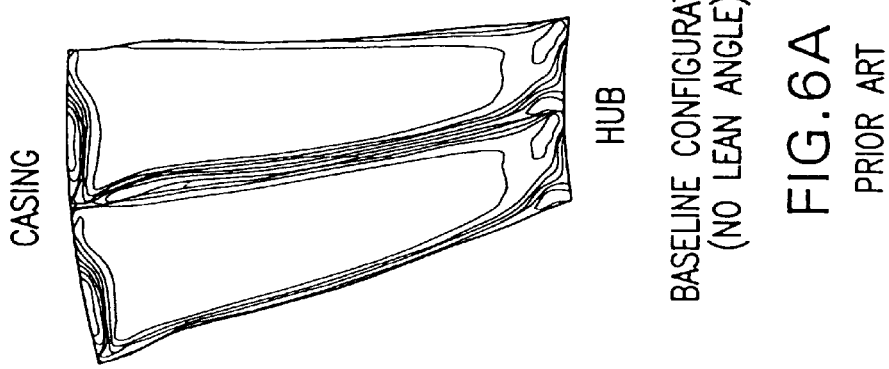
FIG. 6C TUNED LEAN DISTRIBUTION
FIG. 6B UNIFORM LEAN DISTRIBUTION
FIG. 6A PRIOR ART BASELINE CONFIGURATION (NO LEAN ANGLE)

REDUCED NOISE FAN STATIONARY BLADE

BACKGROUND OF THE INVENTION

1. Technical Field of the Invention

The present invention relates to a reduced noise fan stationary blade whose aerodynamic capability is high and in which noise reduction is possible.

2. Description of the Related Art

An engine for a supersonic airliner is a turbo fan engine having a low bypass ratio, and a fan noise is a noise source next to a jet noise. Moreover, in an engine for a subsonic airliner, the bypass ratio has increasingly been raised, and a ratio of the fan noise has relatively increased. Therefore, there has been a demand for further decrease of the existing regulated value of the fan noise in order to raise a future environmental adaptability.

A main source of the fan noise is a tone noise by interference of a moving blade rear flow and stationary blade. Means such as (1) attachment of a sound absorption liner, (2) optimization of the number of moving/stationary blades, and (3) enlargement of a moving/stationary blade interval have heretofore been used as reduction means of the tone noise.

In (1) the attachment of the sound absorption liner, a once generated sound is absorbed by the sound absorption liner. In this means, however, a sound absorption member, for example, of about 70 kg is required for reducing the existing noise by 3 dB, and there is a problem that an engine weight increases.

In (2) the optimization of the number of moving/stationary blades, a cutoff phenomenon is used in which an acoustic mode having a specific frequency propagated in a duct is exponentially attenuated. The number of moving/stationary blades is usually selected so as to cut off a primary peripheral-direction acoustic mode of a blade passing frequency.

However, this means has problems that a method of determining the number of moving/stationary blades is restricted in design, and that the mode capable of being cut off is also limited to a specific mode.

The means of (3) the enlargement of the moving/stationary blade interval enlarges a distance in which the rear flow discharged from a moving blade rear edge reaches the stationary blade, promotes the attenuation of the rear flow, and weakens a nonstationary aerodynamic force on a stationary blade surface as the noise source.

However, this means lengthens an axial length of the entire engine and causes a weight increase.

Moreover, the above-described noise reduction technique has heretofore been applied to the turbo fan engine, and the existing noise regulated value can be achieved, but more noise reduction effect has not been expected.

On the other hand, a sweep lean stationary blade has been reported in the following documents, in which a stacking line of a fan stationary blade is slanted in axial and peripheral directions as shown in FIGS. 1A, 1B in order to achieve the noise reduction of the low bypass ratio turbo fan engine more than is possible today. The figures come from the following two sources:

(1) "Design Selection and Analysis of a Swept and Leaned Stator Concept", NASA/TM-1998-208662, December 1998.

(2) "Benefits of Swept and Leaned Stators for Fan Noise Reduction", 37$^{th}$ Aerospace Sciences Meeting & Exhibit, January 1999.

It has been reported that the fan noise is reduced by about 3 EPNdB in these conventional sweep lean stationary blades. This is because the stationary blade is slanted, a phase of interference with the moving blade rear flow as the sound source is diversified in the radius direction, and as a result the acoustic mode of a radius direction is raised in order and cut off. However, the conventional sweep lean stationary blade has a problem that a system loss increases by about 3% with the noise reduction.

That is, for the conventional sweep lean stationary blade, the noise reduction effect is obtained, but there is a problem that an aerodynamic capability is deteriorated.

SUMMARY OF THE INVENTION

The present invention has been developed in order to solve the above-described problems. That is, an object of the present invention is to provide a reduced noise fan stationary blade in which total pressure losses of both hub and tip sides are reduced, the noise can be reduced on both the hub and tip sides, and thereby noise reduction can be achieved without deteriorating an aerodynamic capability. As used in this description and in the appended claims, "tip side" means the side of the blade opposite the hub side.

As a result of various capability analyses of a conventional sweep lean stationary blade, the inventors of the present invention have found by the analyses that a lean angle of a fan stationary blade is set in a direction opposite to a rotation direction and a high loss region in the vicinity of a hub is thereby improved. Then, it has been confirmed by the analyses that the lean angle of the direction opposite to the rotation direction is set only in the high loss region in the vicinity of the hub, the lean angle of the rotation direction is set in other regions, and thereby the reduced noise fan stationary blade having an aerodynamic loss suppressed can be realized. The present invention is based on such inventive findings.

That is, according to the present invention, there is provided a reduced noise fan stationary blade which has a negative lean angle $\theta_L$ of a direction opposite to a rotation direction in the vicinity of a hub, and a positive lean angle $\theta_L$ of the rotation direction in other regions on a tip side.

According to the constitution, the total pressure losses of both the hub and tip sides are reduced, and the noise can be reduced on both the hub and tip sides.

According to a preferred embodiment of the present invention, the negative lean angle $\theta_L$ is about −20° or more, and less than 0° in the high loss region in the vicinity of the hub, and the positive lean angle $\theta_L$ is about 10° or more, and less than 40° on the tip side.

From study results of the aerodynamic capability described later, it has been confirmed that the total pressure loss is improved and a noise reduction effect is obtained in the range of the lean angle of about −20° or more, less than 0° on the hub side, and in the range of the lean angle of about 10° or more, less than 40° on the tip side.

It is preferable that the negative lean angle $\theta_L$ is −10°±3° in the high loss region in the vicinity of the hub, and the positive lean angle $\theta_L$ is 30°±3° on the tip side.

From the study results of the aerodynamic capability, it has been confirmed that the total pressure loss is minimized and the noise reduction effect is obtained at the lean angle of −10°±3° on the hub side, and at the lean angle of 30°±3° on the tip side.

There is further provided a reduced noise fan stationary blade which has a positive sweep angle $\theta_s$. Since the blade has such positive sweep angle $\theta_s$, the noise can further be reduced on both the hub and tip sides.

The positive sweep angle $\theta_s$ is about 15° or more, and less than 40° on the hub side, and is about 0° or more, and 200 or less on the tip side.

From the study results of the aerodynamic capability described later, it has been confirmed that the total pressure loss is improved and the noise reduction effect is obtained in the range of the positive sweep angle on the hub side of about 15° or more, less than 40°, and in the range of the angle on the tip side of 0° or more, 20° or less.

It is preferable that the positive sweep angle $\theta_S$ is 20°±3° on the hub side, and is also 20°±3° on the tip side.

From the study results of the aerodynamic capability, it has been confirmed that the noise reduction effect is maximized and the total pressure loss can be reduced with the sweep angle $\theta_s$ of 20°±3° on the hub side, and the total pressure loss is reduced and the noise reduction effect is obtained with the angle of 20°±3° on the tip side.

Other objects and advantageous characteristics of the present invention will be apparent from the following description with reference to the accompanying drawings.

BRIEF DESCRIPTION OF THE DRAWINGS

FIGS. 3A and 3B are blade configuration diagrams of the reduced noise fan stationary blade of the present invention.

FIGS. 6A, B, C are comparison diagrams of outlet flow fields of the fan stationary blades.

DESCRIPTION OF THE PREFERRED EMBODIMENT

Figure 1A:
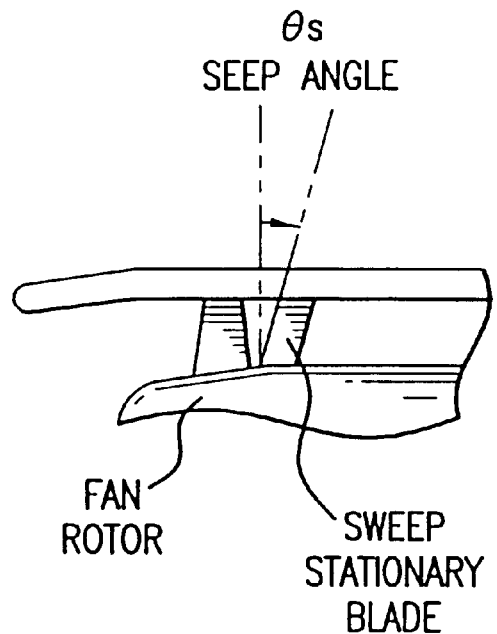
FIGS. 1A and 1B are schematic diagrams of a conventional sweep lean stationary blade.
Figure 1B:
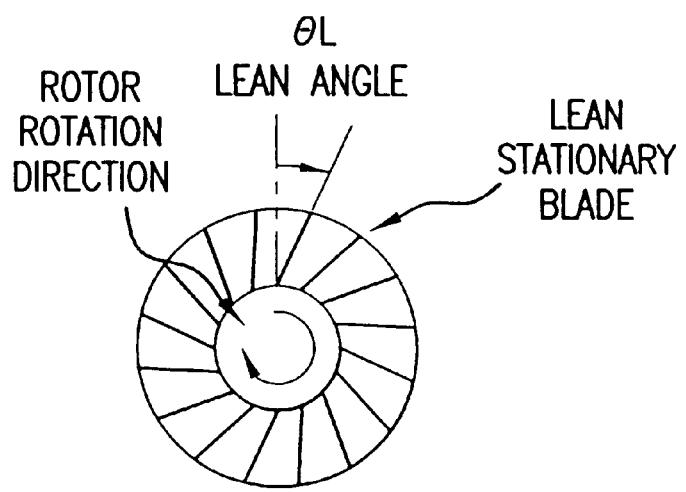

A preferred embodiment of the present invention will be described hereinafter with reference to the drawings. Additionally, in the respective drawings, common components are denoted with the same reference numerals, and redundant description is omitted.

Figure 2B:
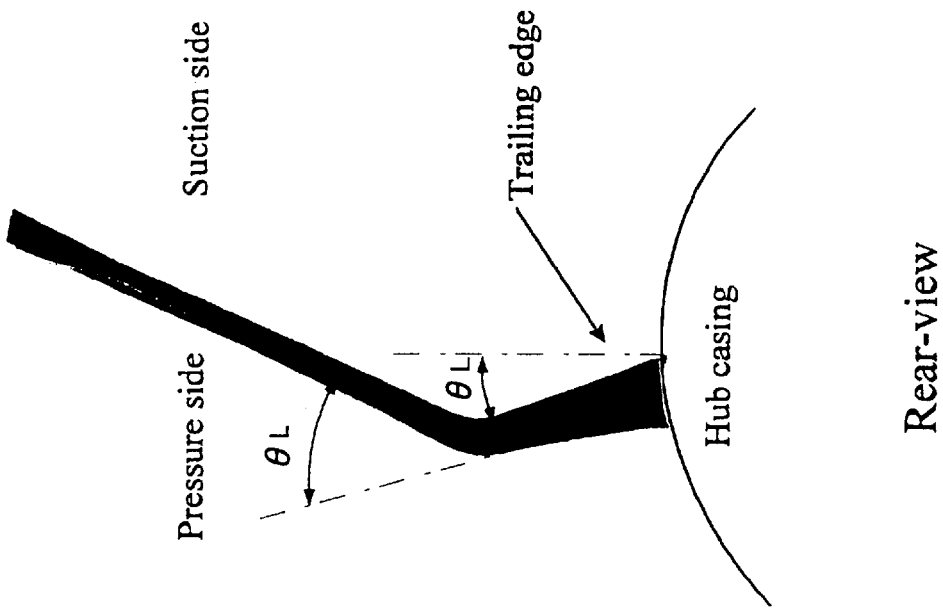
FIGS. 2A and 2B are schematic diagrams of a reduced noise fan stationary blade according to the present invention.
Figure 2A:
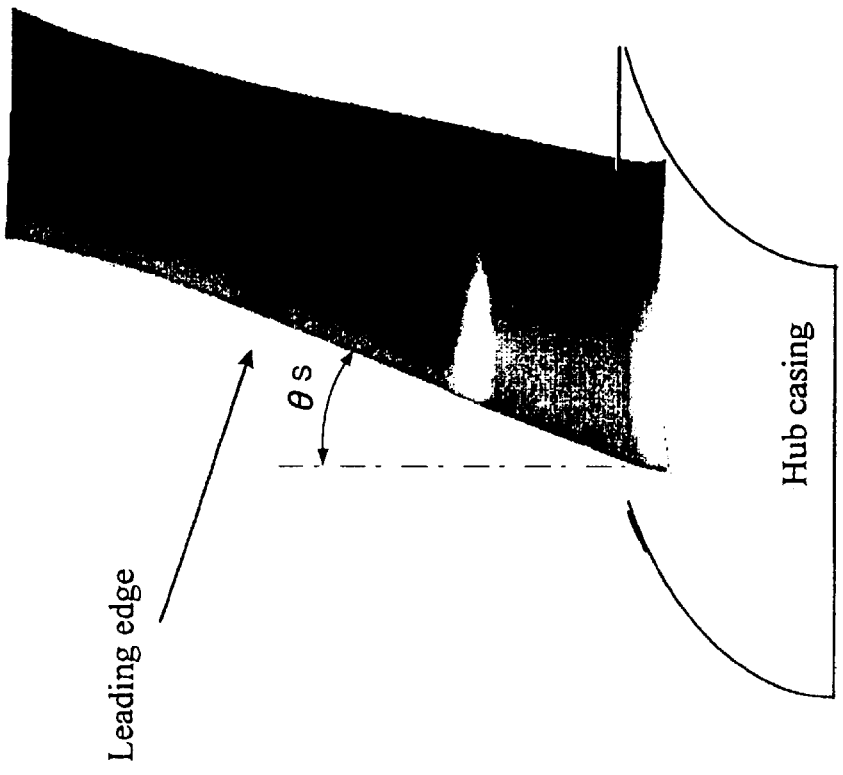

FIGS. 2A and 2B are schematic diagrams of a reduced noise fan stationary blade according to the present invention, and FIGS. 3A and 3B are blade configuration diagrams. Additionally, in these diagrams, FIGS. 2A and 3A are side views, and FIGS. 2B and 3B are rear views.

As shown in FIGS. 2A, 2B, 3A and 3B, a reduced noise fan stationary blade of the present invention has a negative lean angle $\theta_L$ of a direction opposite to a rotation direction in the vicinity of a hub, and has a positive lean angle $\theta_L$ of the rotation direction in other regions on a tip side. Moreover, the blade has a positive sweep angle $\theta_s$.

Figure 4:
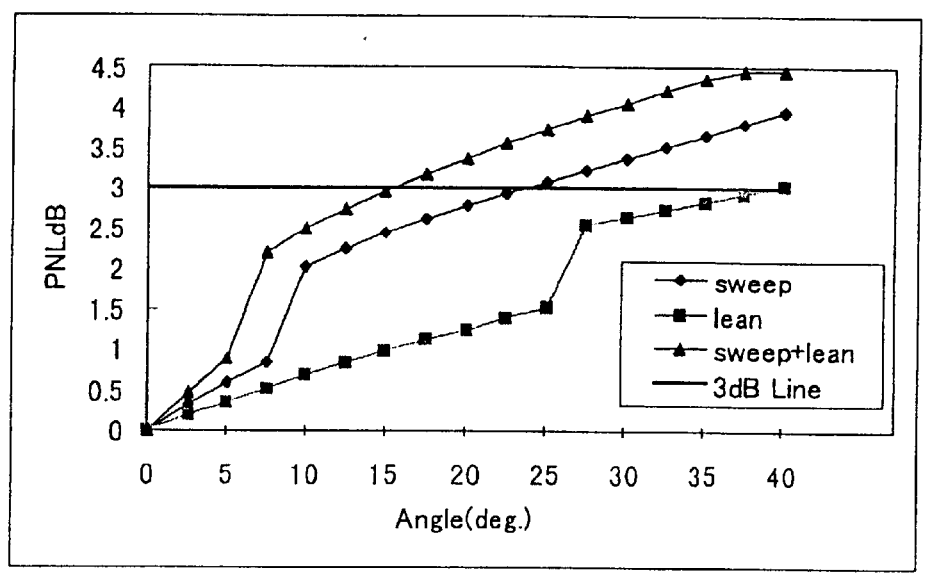
FIG. 4 is a relation diagram between sweep and lean angles and a noise reduction amount.

FIG. 4 is a relation diagram between the sweep and lean angles and a noise reduction amount. In the diagram, the abscissa indicates the sweep and lean angles, and the ordinates indicates the noise reduction amount. Moreover, a horizontal line in the diagram is a target line of a noise reduction amount of 3 PNLdB, and three curves show analysis results of only the sweep angle (♦), only the lean angle (■) and both angles (▲).

This graph shows that a noise reduction effect increases with an increase of the angle for either the sweep or lean angle. Moreover, to obtain the target noise reduction effect, only the lean angle is insufficient. However, it is seen that it is necessary to set only the sweep angle to about 23° or more, and to set both the sweep and lean angles to about 15° or more.

Figure 5D:
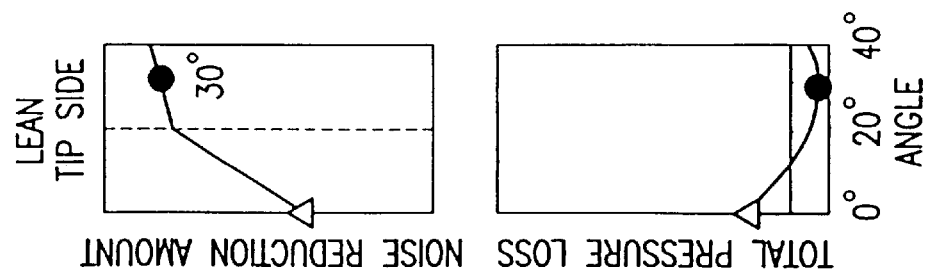
FIGS. 5A, B, C, D are characteristics diagrams of the reduced noise fan stationary blade.
Figure 5C:
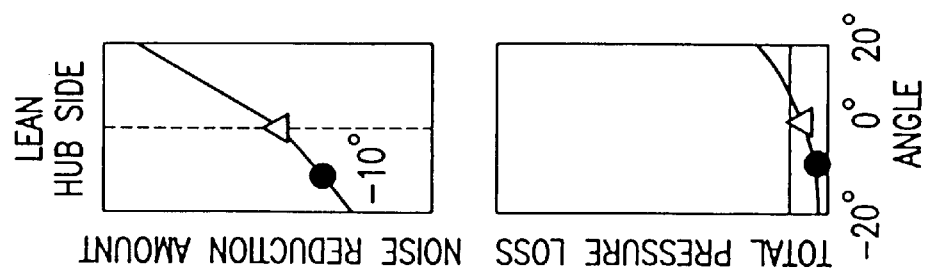
Figure 5B:
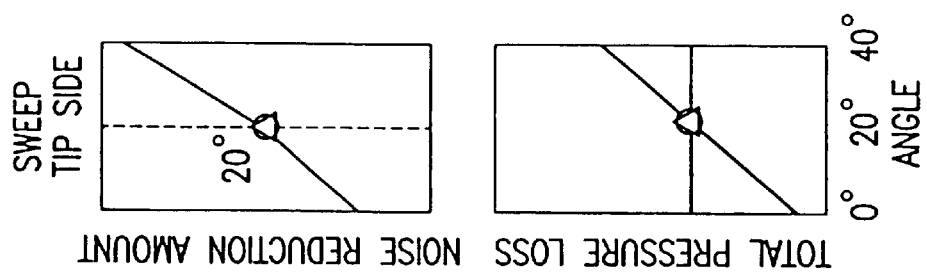
Figure 5A:
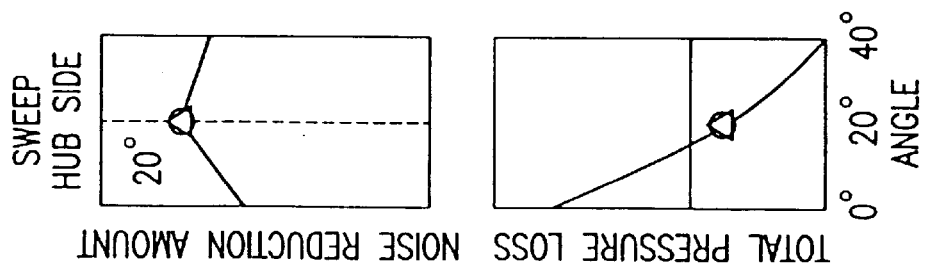

FIGS. 5A, B, C, and D are characteristics diagrams of the reduced noise fan stationary blade. In the drawings, FIGS. 5A and 5B show characteristics of the noise reduction amount (upper view) and total pressure loss (lower view) of a time at which the sweep angle is changed, and FIGS. 5C and 5D show the same characteristics of a time at which the lean angle is changed.

It can be confirmed from FIGS. 5C and 5D that a total pressure loss is improved and a noise reduction effect is also obtained in a range of the lean angle of about −20° or more, less than 0° on the hub side, and in a range of the lean angle of about 10° or more, less than 40° on the tip side. Moreover, particularly, it is seen that the total pressure loss is substantially minimum at the lean angle of about −10° on the hub side, and the noise reduction effect can also be obtained at this angle. It is further seen that the minimum total pressure loss is achieved at the lean angle of about 30° on the tip side, and a very large noise reduction effect can be obtained at this angle.

On the other hand, it can be confirmed from FIGS. 5A and 5B that the total pressure loss is improved and the noise reduction effect is also obtained in a range of the positive sweep angle of about 15° or more, less than 40° on the hub side, and in a range of the angle of about 0° or more, 20° or less on the tip side. Moreover, particularly when the sweep angle $\theta_s$ is about 20° on the hub side, the noise reduction effect is maximized and the total pressure loss can be reduced. Furthermore, when the angle is about 20° on the tip side, the total pressure loss is slightly reduced and the noise reduction effect can also be obtained.

From the characteristics diagrams of FIGS. 5A, B, C, and D, as an optimum configuration example of the reduced noise fan stationary blade according to the present invention, the reduced noise fan stationary blade shown in Table 1 was set. Additionally, as shown in the table, the negative lean angle of −10° is from the hub to a 30% span, and the positive lean angle of 30° is therefrom to the tip side.

TABLE 1

| Type | Swept and leaned stator |
|---|---|
| Sweep angle deg. | 20 |
| Lean angle deg. | |
| From hub to 30% span | −10 |
| From 30% span to tip | 30 |
| Airfoil performance | Equality to baseline stator |

Table 2 shows predicted values of the noise reduction amount of the reduced noise fan stationary blade of the present invention. In the table, (1) shows the reduced noise fan stationary blade (Redesign 1) shown in Table 1, and (2) shows a case in which the lean angle is 0 (Redesign 2) for reference.

This table shows that the amount is a little less than a target noise reduction amount of 3 PNLdB with the lean angle of 0, but the reduced noise fan stationary blade of the present invention sufficiently achieves the target noise reduction amount.

TABLE 2

| Stationary Blade | Lean angle (deg.) | | | Noise reduction amount | | | |
|---|---|---|---|---|---|---|---|
| | Sweep Angle | Hub Side | Tip Side | ΔPNL dB | Total | ΔSPL dB Cross Frequency | Trace speed |
| (1) | 20 | −10 | 30 | 3.13 dB | 5.64 dB | 3.96 dB | 1.68 dB |
| (2) | 20 | 0 | 0 | 2.78 dB | 4.89 dB | 3.21 dB | 1.68 dB |

In Table 3, the reduced noise fan stationary blade (Redesign 1) of the present invention and the stationary blade having a lean angle of 0 for reference (Redesign 2) shown in Table 1 are compared with a conventional stationary blade (Baseline).

This table shows that in the reduced noise fan stationary blade of the present invention (Redesign 1), the total pressure loss is improved by about 30% in terms of a flow rate average and by about 50% in terms of an area average with respect to the conventional stationary blade (Baseline).

TABLE 3

Comparison of Baseline with Redesign

| | Flow rate [kg/s] | Total pressure loss (flow rate average) | Total pressure loss (area average) |
|---|---|---|---|
| Baseline | 12.62 | 0.05873 | 0.09735 |
| Redesign 1 | 12.58 | 0.03960 | 0.04732 |
| Redesign 2 | 12.58 | 0.04016 | 0.05102 |

Table 4 shows a comparison of calculation results when an inflow angle deviates by ±3°. From this table, when the inflow angle deviates on a plus side, a bent portion exerts an influence, but a loss increase is mostly caused by increases of separated regions on the hub and tip sides, and the influence by the bent portion can be said to be small. Moreover, from this table, capability characteristics can be said to be substantially the same in the ranges of the lean and sweep angles of ±3°.

TABLE 4

Confirmation calculation result when the inflow angle deviates by ±3° (Redesign 1)

| | Flow rate [kg/s] | Total pressure loss (flow rate average) | Total pressure loss (area average) |
|---|---|---|---|
| Design | 12.40 | 0.04004 | 0.04900 |
| −3° | 12.70 | 0.03928 | 0.04815 |
| +3° | 12.33 | 0.04385 | 0.05607 |

FIGS. 6A, B, C are comparison diagrams of outlet flow fields of the fan stationary blade, and equal Mach diagrams are compared. In these diagrams, FIG. 6A shows a conventional stationary blade which has no lean angle, FIG. 6B shows a conventional lean stationary blade which has only the positive lean angle, and FIG. 6C shows the reduced noise fan stationary blade of the present invention.

As seen from the diagrams, when the lean angle is set on a positive pressure surface side (negative) on the hub side in FIG. 6C, the separated regions on the hub side shown in the conventional lean stationary blade (FIG. 6B) are remarkably reduced. Therefore, it is seen that by the decrease of the hub-side separated region, the total pressure loss is remarkably reduced as shown in Table 3 described above, and the noise reduction effect can sufficiently be achieved as shown in Table 2.

Moreover, as a result (not shown) of comparison of radius-direction distributions of Mach numbers in inlet and outlet of the blade and outlet flow angles, it has been confirmed that the function of a standard stationary blade is satisfactorily reproduced even in the reduced noise fan stationary blade of the present invention.

Furthermore, as a result (not shown) of analysis of the equal Mach diagrams and flow speed vectors in a plurality of radius positions, it has been confirmed that large separation and backflow do not exist in the flow fields of the reduced noise fan stationary blade of the present invention.

Additionally, from a finite element model for structure analysis and a Campbell diagram showing a characteristic vibration analysis result, it has been confirmed that a resonance point does not exist at a designed rotation speed and in the vicinity of rated 70 to 80% rotation.

As described above, the reduced noise fan stationary blade of the present invention has superior effects that the total pressure losses on both the hub and tip sides are reduced, the noise can be reduced on both the hub and tip sides, the noise reduction can thereby be achieved without deteriorating the aerodynamic capability, there is hardly separation or backflow, and the resonance point does not exist at the designed rotation speed and in the vicinity of rated 70 to 80% rotation.

Additionally, some preferred embodiments of the present invention have been described, but it would be understood that a scope involved in the present invention is not limited to these embodiments. Conversely, the scope of the present invention includes all improvements, modifications and equivalents included in appended claims.

What is claimed is:

1. A reduced noise fan stationary blade which has a negative lean angle $\theta_L$ of a direction opposite to a rotation direction in the vicinity of a hub, a positive lean angle $\theta_L$ of the rotation direction in other regions on a tip side, and a positive sweep angle $\theta_s$, wherein the positive sweep angle $\theta_s$ is about 15° or more, and less than 40° on the hub side, and is about 0° or more, and 20° or less on the tip side.

2. The reduced noise fan stationary blade according to claim 1 wherein said negative lean angle $\theta_L$ is about −20° or more, and less than 0° in a high loss region in the vicinity of said hub, and said positive lean angle $\theta_L$ is about 10° or more, and less than 40° on the tip side.

3. The reduced noise fan stationary blade according to claim 1 wherein said negative lean angle $\theta_L$ is −10°±3° in a high loss region in the vicinity of said hub, and said positive lean angle $\theta_L$ is 30°±3° on said tip side.

4. A reduced noise fan stationary blade which has a negative lean angle $\theta_L$ of a direction opposite to a rotation direction in the vicinity of a hub, a positive lean angle $\theta_L$ of the rotation direction in other regions on a tip side, and a positive sweep angle $\theta_s$, wherein the positive sweep angle $\theta_s$ is 20°±3° on a hub side, and is also 20°±3° on the tip side.

5. The reduced noise fan stationary blade according to claim 4 wherein said negative lean angle $\theta_L$ is about −20° or more, and less than 0° in a high loss region in the vicinity of said hub, and said positive lean angle $\theta_L$ is about 10° or more, and less than 40° on said tip side.

6. The reduced noise fan stationary blade according to claim 4 wherein said negative lean angle $\theta_L$ is −10°±3° in a high loss region in the vicinity of said hub, and said positive lean angle $\theta_L$ is 30°±3° on the tip side.

* * * * *